(12) United States Patent
Scaife et al.

(10) Patent No.: US 8,011,179 B2
(45) Date of Patent: Sep. 6, 2011

(54) METHOD AND SYSTEM FOR MAINTAINING AFTERTREATMENT EFFICIENCY

(75) Inventors: Mark Scaife, Metamora, IL (US); Trent Cleveland, Metamora, IL (US); Michael Lowe, Metamora, IL (US); Cornelius Opris, Peoria, IL (US); Evan Jacobson, Peoria, IL (US); Matthew R. Roth, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 1103 days.

(21) Appl. No.: 11/806,359

(22) Filed: May 31, 2007

(65) Prior Publication Data
US 2008/0295484 A1 Dec. 4, 2008

(51) Int. Cl.
*F01N 3/00* (2006.01)
(52) U.S. Cl. ............... 60/297; 60/288; 60/289; 60/295; 60/293
(58) Field of Classification Search ............ 60/288, 60/289, 295, 293, 297
See application file for complete search history.

(56) References Cited

U.S. PATENT DOCUMENTS

| | | |
|---|---|---|
| 5,110,747 A | 5/1992 | Pataschnick et al. |
| 5,195,316 A | 3/1993 | Shinzawa et al. |
| 5,196,170 A | 3/1993 | Patashnick et al. |
| 5,279,970 A | 1/1994 | Patashnick et al. |
| 5,401,468 A | 3/1995 | Patashnick et al. |
| 5,727,386 A * | 3/1998 | Watanabe et al. ............ 60/323 |
| 6,622,480 B2 | 9/2003 | Tashiro et al. |
| 6,722,120 B2 * | 4/2004 | Plote ............................ 60/276 |
| 6,829,890 B2 | 12/2004 | Gui et al. |
| 6,907,862 B2 | 6/2005 | Kitahara |
| 6,928,809 B2 | 8/2005 | Inoue et al. |
| 6,941,750 B2 | 9/2005 | Boretto et al. |
| 6,962,045 B2 | 11/2005 | Kitahara et al. |
| 6,989,045 B2 | 1/2006 | Bailey et al. |
| 7,063,642 B1 | 6/2006 | Hu et al. |
| 7,065,960 B2 | 6/2006 | Gioannini et al. |

(Continued)

FOREIGN PATENT DOCUMENTS

EP 1 086 741 A2 3/2001

(Continued)

OTHER PUBLICATIONS

Southwest Research Institute, Technical Proposal, Diesel Aftertreatment Sensitivity to Lubricants (DASL) and Non-Thermal Catalyst Deactivation (N-TCD), Jun. 13, 2001 (54 pages).

(Continued)

*Primary Examiner* — Thomas E Denion
*Assistant Examiner* — Michael Carton
(74) *Attorney, Agent, or Firm* — Finnegan, Henderson, Farabow, Garrett & Dunner LLP (57) ABSTRACT

A method is provided for compensating for factors affecting particulate matter accumulation within an aftertreatment element of an engine exhaust system. The method comprises determining rate of change of flow resistance through the aftertreatment element with time. Regeneration is periodically initiated to reduce particulate matter accumulation within the aftertreatment element. Rate of change of flow resistance through the aftertreatment element over time is correlated with at least a model of particulate matter accumulation within the aftertreatment element and a model of regeneration frequency of the aftertreatment element, based on predetermined values for particulate matter accumulation and regeneration frequency. Action, at least including increasing regeneration frequency, is initiated to compensate for an increased rate of particulate matter accumulation in the aftertreatment element.

21 Claims, 2 Drawing Sheets

U.S. PATENT DOCUMENTS

| | | | |
|---|---|---|---|
| 7,134,274 B2 | 11/2006 | Asanuma | |
| 7,143,578 B2* | 12/2006 | Kakwani et al. | 60/286 |
| 7,188,512 B1 | 3/2007 | Wills | |
| 7,191,590 B2 | 3/2007 | Nagaoka et al. | |
| 2003/0196430 A1* | 10/2003 | Brown et al. | 60/297 |
| 2004/0172933 A1 | 9/2004 | Saito et al. | |
| 2004/0200198 A1 | 10/2004 | Inoue et al. | |
| 2006/0005534 A1 | 1/2006 | Wirth et al. | |
| 2006/0191258 A1 | 8/2006 | Opris | |
| 2007/0006577 A1 | 1/2007 | Yokoyama et al. | |
| 2007/0056270 A1 | 3/2007 | Liimatta et al. | |
| 2007/0056271 A1* | 3/2007 | Berryhill et al. | 60/297 |
| 2007/0056272 A1 | 3/2007 | Dollmeyer et al. | |
| 2007/0065341 A1 | 3/2007 | Asanuma | |
| 2007/0144146 A1* | 6/2007 | Kusatsugu | 60/277 |
| 2007/0186536 A1* | 8/2007 | Hashizume | 60/278 |

FOREIGN PATENT DOCUMENTS

| | | |
|---|---|---|
| EP | 1 103 702 A2 | 5/2001 |
| EP | 1 174 600 A2 | 1/2002 |
| EP | 1 387 051 A1 | 2/2004 |
| EP | 1 460 245 A1 | 9/2004 |
| EP | 1 467 071 A1 | 10/2004 |
| EP | 1529929 | 5/2005 |
| EP | 1541829 | 6/2005 |
| WO | WO 00/08311 | 2/2000 |
| WO | WO 2005/121515 A1 | 12/2005 |

OTHER PUBLICATIONS

Scaife et al., U.S. Patent Application filed May 31, 2007, entitled "Method and System for Maintaining Aftertreatment Efficiency," (23 pages).

* cited by examiner

FIG. 1

FIG. 2

METHOD AND SYSTEM FOR MAINTAINING AFTERTREATMENT EFFICIENCY

TECHNICAL FIELD

The present disclosure is directed to reducing particulate emissions and, more particularly, to methods and systems for maintaining efficiency of aftertreatment in reducing particulate emissions.

BACKGROUND

Engines, including diesel engines, gasoline engines, natural gas engines, and other engines known in the art, may exhaust a complex mixture of emissions. The emissions may include both gaseous and solid material, such as, for example, particulate matter. Particulate matter may include ash and unburned carbon particles generally referred to as soot. Emissions also may include compounds containing sulfur. For example, engine fuels, including diesel engine fuels, may contain sulfur which ultimately finds its way into an engine exhaust system from which it may be emitted to the environment.

Environmental concerns have resulted in the development of systems to treat engine exhaust. Some of these systems may employ exhaust treatment devices, such as filter systems that include particulate filters, to remove particulate matter from the exhaust flow. A particulate filter may include filter material designed to capture particulate matter, and may have an associated catalytic component. After an extended period of use, however, the filter material may become partially saturated with particulate matter, such as soot. This partial saturation may result in plugging to the point that backpressure on the engine is excessive and adversely affects engine operation.

A large portion of the collected particulate matter, e.g. soot, may be removed from the filter material through a process called regeneration. Filter systems may be characterized as passive filters or active filter, depending on the primary mode of regeneration. For example, in passive filters, a catalyst component generally may be incorporated to aid oxidation of particulate matter (e.g. soot), and heat required for oxidation may be provided by exhaust system temperatures. Regeneration of active filters may be accomplished by increasing the temperature at the site of the filter system periodically to oxidize particulate matter during a regeneration cycle. Particulate matter, e.g. soot, may be consumed by the heat of the regeneration process.

Various factors may affect particulate matter emissions and lead to increased accumulation of particulate matter within an aftertreatment element. For example, it has been found that particulate matter emissions may increase where fuel of high sulfur content is consumed by an engine. On the other hand, use of fuel of low sulfur content (e.g. ultra low sulfur diesel (ULSD)), may, in an otherwise properly operating engine system, not only result in less sulfur compounds being emitted to the environment, but also result in less particulate matter emissions. As another example, boost leaks in an engine system may alter expected air/fuel ratios and lead to increased particulate matter emissions. As yet another example, overcooling of the engine may lead to inefficient combustion and an increase in particulate matter emissions.

It is desirable that there be some effective manner for compensating for various factors affecting particulate matter accumulation within aftertreatment elements, such as fuel of high sulfur content, boost leaks, and engine overcooling, for example, and otherwise maintain particulate filter efficiency by accounting for such factors.

One system that addresses the effect of the sulfur component of engine fuel on exhaust aftertreatment is disclosed in European Patent Application No. EP 1 174 600 A2, published on Jan. 23, 2002 ("the '600 publication"). The '600 publication discloses an embodiment that includes a particulate filter for removing particulate matter, with the particulate filter including a $NO_x$ absorbent. The '600 publication discloses procedures and systems for addressing sulfur poisoning of the $NO_x$ catalyst (the poisoning being manifested as $SO_x$) while avoiding thermal deterioration of the particulate filter. In one embodiment, the '600 publication separates a regeneration process to remove particulate matter from the particulate filter from a process for recovering $NO_x$ catalyst from sulfur poisoning. In another embodiment, the '600 publication controls an amount of fuel injected into the exhaust system in accordance with an estimated amount of particulate matter accumulation in order to consume the particulate matter before the higher temperature reduction process ensues for the sulfur poisoned $NO_x$ catalyst, thereby avoiding thermal deterioration.

While the procedures and systems of the '600 publication may address one factor affecting particulate matter accumulation within an aftertreatment element (i.e., sulfur poisoning), the systems of the '600 publication may be unduly complex to implement and operate reliably. In addition, the '600 publication focuses specifically on the issue of sulfur poisoning of $NO_x$ catalyst rather than a more generic approach that addresses a number of potential engine system failures. The '600 publication presumes, via a data map, that the $NO_x$ catalyst will be poisoned by sulfur and require the implementation of the procedures for alleviating the sulfur poisoning. The '600 publication does not take into account the factors that ultra low sulfur fuels may be employed normally, but that the engine may inadvertently or necessarily be fueled with higher sulfur containing fuel at times. Accordingly, the system of the '600 publication may lack the flexibility necessary to accommodate and compensate for various factors that may lead to an increased rate of accumulation of particulate matter in an aftertreatment element.

The disclosed methods and systems for maintaining aftertreatment efficiency are directed toward overcoming one or more of the problems set forth above.

SUMMARY OF THE INVENTION

In one exemplary embodiment of the present disclosure, a method is provided for compensating for factors affecting particulate matter accumulation within an aftertreatment element of an engine exhaust system. The method includes determining rate of change of flow resistance through the aftertreatment element with time. The method also includes periodically initiating regeneration to reduce particulate matter accumulation within the aftertreatment element. The method also includes correlating rate of change of flow resistance through the aftertreatment element over time with at least a model of particulate matter accumulation within the aftertreatment element and a model of regeneration frequency of the aftertreatment element, based on predetermined values for particulate matter accumulation and regeneration frequency. The method also includes initiating action, at least including increasing regeneration frequency, to compensate for an increased rate of particulate matter accumulation in the aftertreatment element.

In another exemplary embodiment of the present disclosure, a system is provided for compensating for factors affecting particulate matter accumulation within an aftertreatment element of an engine exhaust system. The system includes at least one filter section within the aftertreatment element. The system also includes a controller configured to determine rate of change of flow resistance through the aftertreatment element with time; periodically initiate regeneration to reduce particulate matter accumulation within the aftertreatment element; correlate rate of change of flow resistance through the aftertreatment element with time with at least a model of particulate matter accumulation within the aftertreatment element and a model of regeneration frequency of the aftertreatment element, based on predetermined values for particulate matter accumulation and regeneration frequency; and initiate action, at least including increasing regeneration frequency, to compensate for an increased rate of particulate matter accumulation in the aftertreatment element.

In still another exemplary embodiment of the present disclosure, a machine is provided comprising an engine including an exhaust system. The machine includes an aftertreatment element, including at least one filter section, in the exhaust system. The machine also includes a control system including a controller. The controller is configured to determine rate of change of flow resistance through the aftertreatment element with time; periodically initiate regeneration to reduce particulate matter accumulation within the aftertreatment element; correlate rate of change of flow resistance through the aftertreatment element with time with at least a model of particulate matter accumulation within the aftertreatment element and a model of regeneration frequency of the aftertreatment element, based on predetermined values for particulate matter accumulation and regeneration frequency; and initiate action, at least including increasing regeneration frequency, to compensate for an increased rate of particulate matter accumulation in the aftertreatment element.

DETAILED DESCRIPTION

Figure 1:
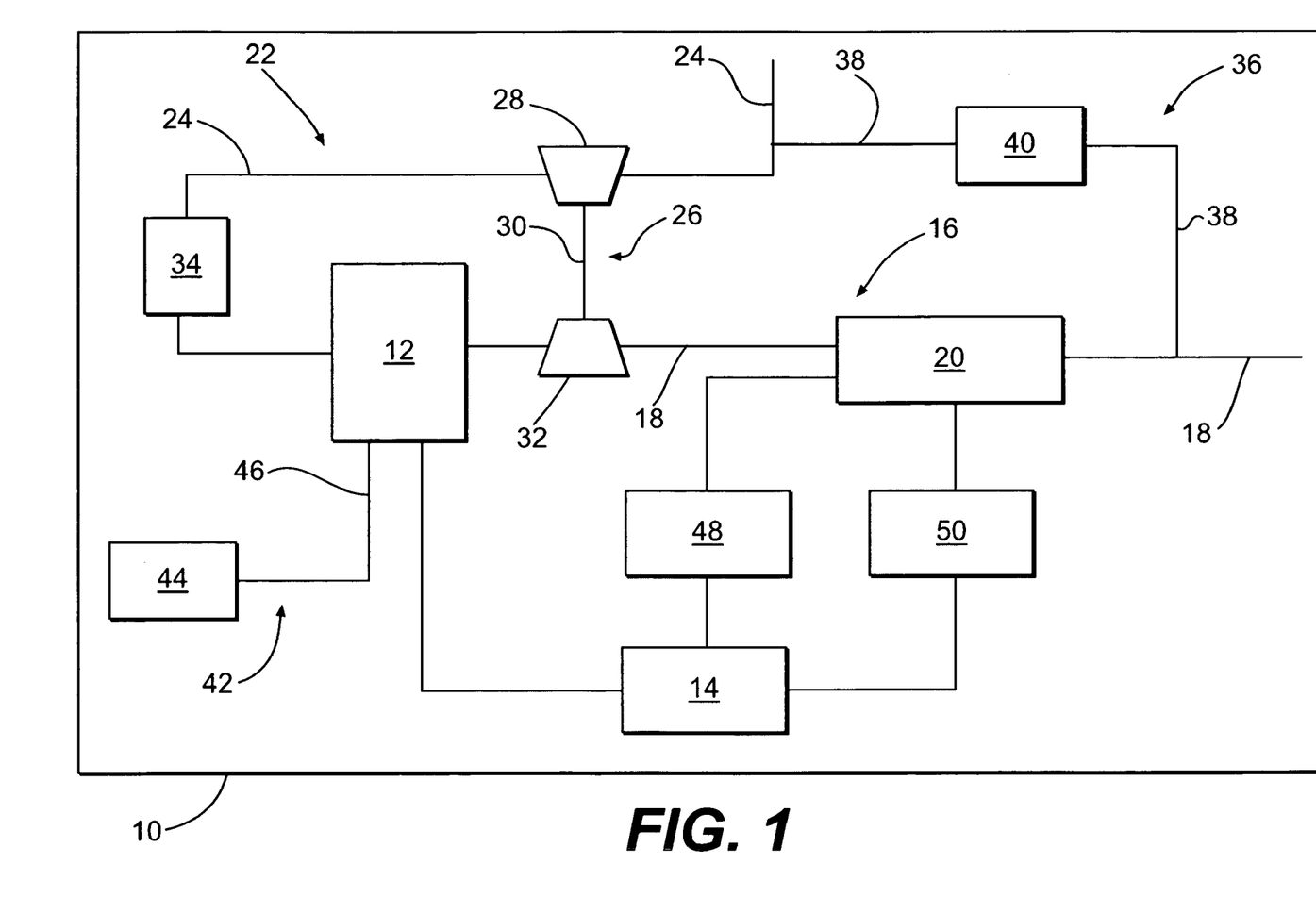
FIG. 1 is a diagrammatic and schematic illustration of a machine including a system according to an exemplary embodiment of the present disclosure.

A machine 10, in which exemplary disclosed embodiments may be implemented, is diagrammatically represented in FIG. 1. Machine 10 may be any of various machines, including an on-highway truck, an off-highway haulage unit, an excavating machine, a material handling machine, a stationary power generating machine, any of various heavy equipment machines, or any other machine which may benefit from implementation of embodiments according to the disclosure.

An engine 12 may be associated with machine 10. Engine 12 may be any one of various types of engines, such as, a gasoline fueled engine, a diesel fueled engine, or a gas fueled engine. A controller 14 may be associated with machine 10 and engine 12. Controller 14 may be programmed, via hardware, software, algorithms, etc., to monitor and control operation of engine 12, various components associate with engine 12, and/or other machine components.

Engine 12 may include an exhaust system 16. Exhaust system 16 may be employed to convey a flow of engine exhaust, including gases and particulate matter, from engine 12 via, for example, a suitable exhaust passageway 18. The flow of engine exhaust may be directed through an aftertreatment element 20 associated with exhaust system 16. Aftertreatment element 20 may include various components configured to treat the exhaust gases and/or remove particulate matter. For example, aftertreatment element 20 may include a particulate filter and/or a catalytic component.

Engine 12 may include an intake system 22. Intake system 22 may be employed to convey intake air to engine 12 via a suitable intake passageway 24, for example. In exemplary embodiments, intake system 22 may include one or more suitable components for boosting the pressure of the intake air to a suitable pressure in excess of atmospheric pressure. For example, in the exemplary embodiment illustrated schematically in FIG. 1, intake air may be boosted by a turbocharger 26 including a compressor component 28 driven via a suitable shaft 30 by a turbine component 32 associated with exhaust system 16. Engine exhaust may provide energy for driving turbine component 32 which may, in turn, drive compressor 28 to compress intake air. Downstream from compressor component 28 in intake system 22, a suitable cooling unit 34 may be provided to suitably moderate the temperature of the compressed intake air before it enters engine 12.

A clean gas induction (CGI) system 36 may be associated with the exhaust system 16 and the intake system 22. In the exemplary embodiment illustrated in FIG. 1, for example, CGI system 36 may include a flow passageway 38 for directing a portion of exhaust gases from a location in exhaust system 16 that is downstream of aftertreatment element 20 to a location in intake system 22. CGI system 36 may deliver "clean" exhaust gases (i.e., exhaust gases that have been subjected to aftertreatment within aftertreatment element 20 to remove particulates and/or other emissions) for reintroduction to engine 12.

In the exemplary embodiment illustrated in FIG. 1, flow passageway 38 for CGI system 36 may connect to exhaust passageway 18 for receiving clean exhaust gases, and may connect to intake passageway 24 upstream of compressor 28. CGI system 36 may include various components 40, diagrammatically illustrated, including flow sensing equipment, one or more valve elements, and a cooling unit.

Both intake system 22 and exhaust system 16 also may include various unillustrated intake and exhaust system components generally associated with intake and exhaust systems. These components, not illustrated, may include intake air filtration elements, additional compressor components (including one or more superchargers and/or one or more additional turbochargers), additional cooling units, suitable valve elements, diagnostic components for gathering data, and additional exhaust treating components.

Engine 12 may include a fuel system 42 for delivering fuel to engine 12 for combustion, for example. Fuel system 42 may include a suitable fuel source 44, such as, for example, a tank located on machine 10, and a fuel passageway 46 for directing fuel from fuel source 44 to engine 12. Fuel system 42 may be configured to deliver fuel to engine 12 for injection by suitable injection units (not shown). Fuel system 42 may be configured to deliver fuel to various injection units (not shown) that may be associated with intake system 22 and/or regeneration component 48, for example. Fuel source 44 may supply fuel of a type suitable for the particular type of engine 12 that may be employed on machine 10. For example, in an exemplary embodiment, engine 12 may be a diesel engine, and the type of fuel supplied by fuel source 44 may be a fuel generally known as ultra low sulfur diesel, which may include approximately 15 parts per million (ppm) sulfur content. It will be recognized that the fuel supplied by fuel source 44 may at times be of a different type, such as a diesel fuel with higher sulfur content (e.g., approximately 350 to 500 ppm sulfur content or higher).

In one exemplary embodiment, aftertreatment element 20 may include a particulate filter configured to remove particulate matter from the flow of exhaust. The particulate matter may include soot and ash. As engine 12 operates, particulate matter may accumulate within the aftertreatment element 20. As the quantity of particulate matter increases beyond a certain amount, the pressure differential and resistance to flow across the aftertreatment element 20 may increase. This increase in pressure and resistance to flow, indicating a build-up of particulate matter within the aftertreatment element 20, may adversely affect engine operation and decrease the effectiveness of the aftertreatment element 20 in treating exhaust.

As a general rule, the largest component of particulate matter that accumulates in aftertreatment element 20 may be soot. Soot, which is unburned carbon particles, may be consumed and removed from the aftertreatment element 20 during a process of regeneration. Regeneration may be by way of passive regeneration, which may employ a catalyst to aid the removal of particulate matter from the aftertreatment component 20. Regeneration also may be by way of active regeneration wherein a regeneration cycle may be initiated by a regeneration component 48. Alternatively, an aftertreatment component 20 may be configured to take advantage of both passive regeneration and active regeneration. In the exemplary embodiment illustrated in FIG. 1, for example, a regeneration component 48 may be employed that is of the type that increases the temperature within aftertreatment element 20 sufficiently to effectively burn the soot away.

Regeneration component 48 may be configured to operate periodically. For example, controller 14 may be configured to initiate a regeneration cycle by regeneration component 48 on a pre-programmed timed basis, e.g., after a predetermined number of hours of engine operation. Alternatively, or additionally, regeneration component 48 may be configured to operate responsive to a diagnostic component configured to ascertain when aftertreatment element has accumulated an amount of particulate matter sufficient to implicate regeneration.

FIG. 1 diagrammatically illustrates a flow resistance diagnostic element 50 that may determine resistance to flow through the aftertreatment element 20. For example, the flow resistance diagnostic element 50 may include pressure measuring elements located upstream and downstream of aftertreatment element 20 and configured to yield data indicative of a pressure drop across the aftertreatment element 20. Other diagnostic elements capable of determining flow resistance are contemplated. In an exemplary embodiment, when a flow resistance reaches a value above a predetermined value, as determined by flow resistance diagnostic element 50, controller 14 may initiate a regeneration cycle by regeneration component 48.

Engine 12 may have known characteristics, for example based on laboratory and/or field tests and/or a history of engine operation. For example, it may be known how much particulate matter engine 12 may produce when subjected to various speeds, loadings, and/or operating conditions. In an exemplary embodiment, the known characteristic of how much particulate matter engine 12 may produce under various speeds, loadings, and/or operating conditions may be reduced to an on-board model based on predetermined values and associated with controller 14. As a result, controller 14 may employ the on-board model in association with diagnostic data from actual, real time engine operation to predict particulate matter accumulation within aftertreatment element 20.

Another example of a characteristic of engine 12 that may be known, e.g., from laboratory and/or field tests and/or a history of engine operation, is regeneration frequency. For example, laboratory and/or field tests and/or a history of engine operation may permit a determination of the most effective and efficient regeneration strategy, e.g., frequency of regeneration, for encountered engine operation conditions, and/or speed, and/or loading. In an exemplary embodiment, the known characteristic of effective and efficient regeneration frequency for various speeds, loadings, and/or operating conditions is reduced to an on-board model based on predetermined values and associated with controller 14. As a result, controller 14 may employ the on-board model in association with diagnostic data from system operation to predict particulate matter accumulation within aftertreatment element 20.

Other characteristics related to engine 12 may be known and modeled. In exemplary embodiments, rates and effectiveness for passive regeneration of the aftertreatment element based on predetermined values for passive regeneration accounting for various engine speeds, loadings, and operating conditions may be included as on-board models.

An aftertreatment element 20 may accumulate an amount of particulate matter, from an engine that is properly operating under various speeds, loads, and operating conditions that corresponds with reasonable reliance on particulate matter accumulation in accordance with a model of particulate matter accumulation. Various factors may anomalously affect the accumulation of particulate matter in aftertreatment element 20, and may result in an accumulation of particulate matter in aftertreatment element 20 at variance with that which may be predetermined in the process of developing models for particulate matter accumulation, regeneration frequency, etc. Under real world conditions of operation, these various factors may manifest themselves and yield particulate matter accumulations at variance from model behavior.

One factor that may affect particulate matter accumulation within aftertreatment element 20 is the consumption of a fuel with high sulfur content. For example, an exemplary embodiment of an aftertreatment element 20 may include a catalytic component for treating particulate matter. The catalytic component may be adversely affected, i.e., become less efficient in treating particulate matter, as sulfur compounds accumulate and/or react with the catalytic component. As a result, the rate of accumulation of particulate matter may increase.

Another factor that may affect particulate matter accumulation within aftertreatment element 20 is one or more boost leaks. A machine 10 may include one or more turbochargers 26 or other expedients for increasing the pressure of intake air and the quantity of air that may be supplied to engine cylinders during cycles of engine operation. An on-board model of, for example, particulate matter accumulation within aftertreatment element 20, could be based on the data derived from a properly operating boost system. Any leak in the boost system may then result in variance in the air/fuel ratio of the engine. The result of such variances may result in an increase of particulate matter being exhausted from engine 12, and an increase in the rate of particulate matter accumulation within aftertreatment element 20. According to an exemplary embodiment, the model will include parameters describing intake manifold conditions, thus accounting for normal boost leaks.

Another factor that may affect particulate matter accumulation within aftertreatment element 20 is overcooling of the engine. A model of engine operation may not adequately account for those periods where engine operation occurs at a temperature lower than an efficient operating temperature. For example, during cold startup, there is a period of time wherein engine 12 may generate excessive particulate matter until the engine achieves a steady state operating temperature. This may occur with more frequency in periods of cold weather and/or times when shutdown and startup may be more frequent, exacerbating the effects of overcooling. Advanced timing may also result in low coolant temperature and engine overcooling. As a result, the rate of accumulation of particulate matter within aftertreatment element 20 could vary from the model. According to an exemplary embodiment, the model will account for expected levels of engine overcooling.

Another factor that may affect particulate matter accumulation within aftertreatment element 20 is excessive oil consumption. A model of engine operation may not adequately account for excessive oil consumption where, for example, piston rings in one or more cylinders inadvertently have been installed upside down. In such a situation, the rate of accumulation of particulate matter within aftertreatment element 20 may vary from the model.

During operation, regeneration of aftertreatment element 20 may occur periodically, e.g., in accordance with a pre-programmed schedule. Flow resistance diagnostic element 50 may detect a flow resistance value after each regeneration cycle. As particulate matter accumulates in the aftertreatment element 20, the flow resistance value may increase in a manner at variance with an on-board model. This may reflect the existence of one or more factors anomalously affecting particulate matter accumulation.

A determined increase in the rate of particulate matter accumulation in aftertreatment element 20 may apprise an operator and/or initiate action to compensate for the increased rate of particulate matter accumulation. For example, controller 14 may initiate an increase in the frequency of regeneration, for example, by regeneration component 48. Alternatively, upon being apprised of the increase in rate of particulate matter accumulation, an operator may initiate an increased rate of regeneration of aftertreatment element 20 to compensate for the increased rate of particulate matter accumulation.

Other actions may be taken to compensate for a determined increase in the rate of particulate matter accumulation. For example, it may be determined that fuel supplied from source 44 contains sulfur in an amount in excess of the norm. Where a model is based on operation of engine 12 fueled with ultra low sulfur diesel, for example, a real world factor includes those situations where fuel of substantially higher sulfur content may be inadvertently or unavoidably supplied. In such a situation, in compensation for an ensuing increase in the rate of particulate matter accumulation in aftertreatment element 20, the fueling factor may be suitably addressed by taking measures to ensure that ultra low sulfur diesel is supplied to fuel source 44.

Where it is determined that an increased rate of particulate matter accumulation in aftertreatment element 20 may be due to consumption of fuel of high sulfur content, an enabled CGI system may be disabled in order, for example, to prevent possible formation of sulfuric acid in the CGI system. In addition, because increased sulfur in the fuel may result in less than optimum efficiency of the aftertreatment element 20, disabling the CGI system may prevent exhaust that may be in less than a "clean" state from being inducted into the intake system and, ultimately, from entering engine 12.

Another action that may be taken to compensate for a determined increase in the rate of particulate matter accumulation is to evaluate for and eliminate boost leaks that may be beyond the norm, and thus excessive. For example, where an increased rate of particulate matter accumulation has occurred, an operator may be prompted to check for abnormal leaks, for example at compressor component 28 or downstream of compressor component 28, that may cause the air/fuel ratio to be at variance with the norm upon which an on-board model may be based in part. Where such a leak exists, action may be initiated to make appropriate repairs, such as closing any excessive leaks or replacing defective parts. Yet another action may be to undertake an analysis to determine the cause of any excessive oil consumption which may be, in turn, the cause of an increased rate of particulate matter accumulation in aftertreatment element 20.

INDUSTRIAL APPLICABILITY

The disclosed embodiments may be used to facilitate effective and efficient engine operation and reduction of particulate matter emissions to the environment. Aftertreatment elements which may benefit from the disclosed embodiments may include those including any types of filters known in the art which are capable of trapping particulate matter and capable of being regenerated. For example, the disclosed embodiments find applicability in connection with particulate filters, including diesel particulate filters. The disclosed embodiments may be employed with advantage in various on-highway trucks, off-highway haulage units, excavating machines, material handling machines, stationary power generating machines, and any of various heavy equipment machines.

Figure 2:
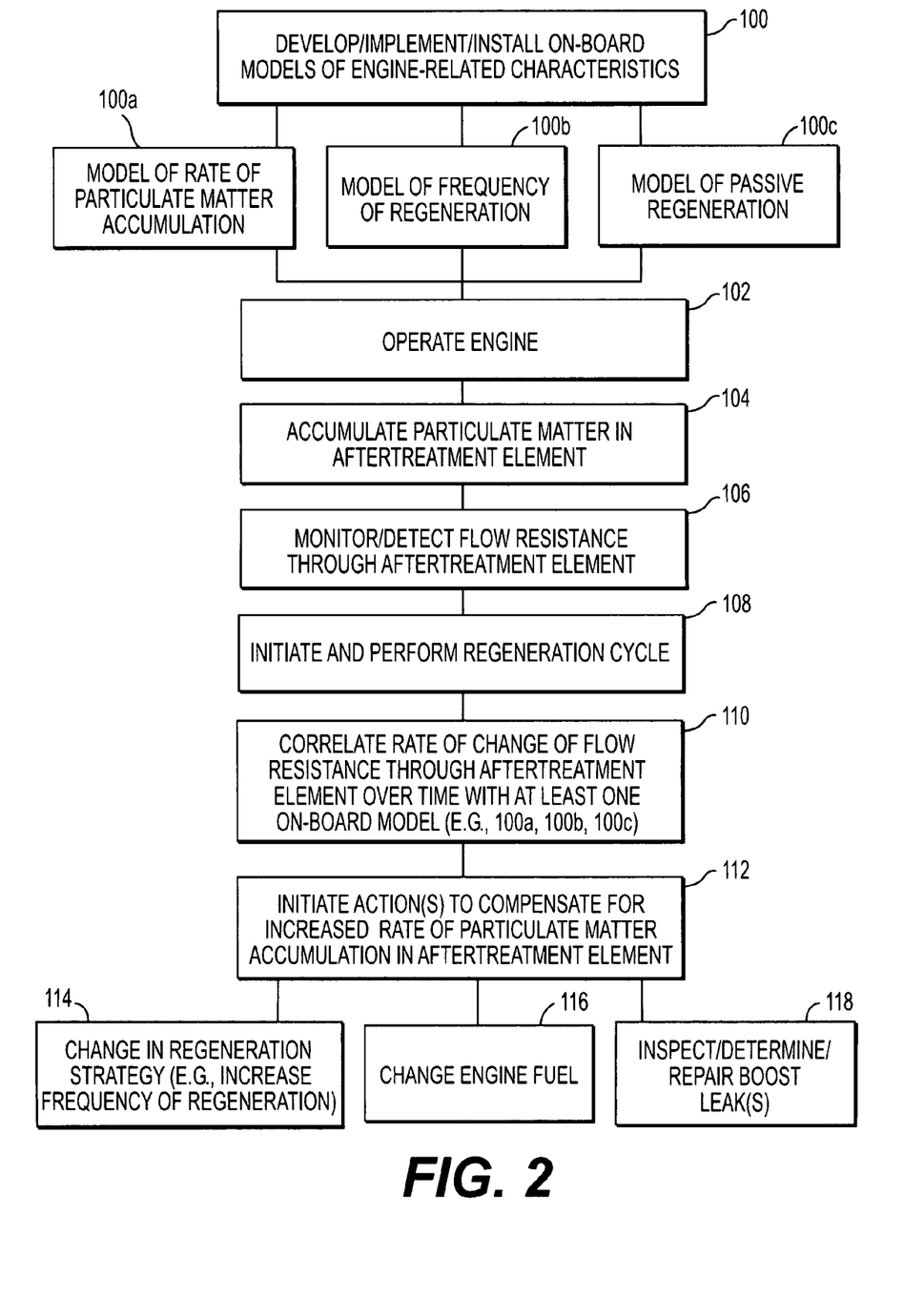
FIG. 2 is a diagram illustrating certain events that may be included in exemplary embodiments of the present disclosure.

FIG. 2 illustrates schematically one possible exemplary implementation of a disclosed process and system in accordance with embodiments of the disclosure. While a certain sequence of events or actions may initially be implied by the schematic illustration of FIG. 2, it should be noted that it is within the scope of this disclosure that the sequence may be altered, that certain events or actions may not occur in the sequence, and that other events or actions, in addition to those discussed and illustrated, may occur.

Referring to the exemplary and schematic illustration in FIG. 2, various models, at 100, may be developed, implemented, and installed on-board a machine 10. For example, a model of particulate matter production by engine 12, at 100a, may be developed in various ways, including a history of experience with the particular type of engine, engine field tests, laboratory tests, etc. The model may provide a map of particulate matter production at various speeds and loads or other engine operating conditions, for example. The model may be implemented/installed in controller 14 associated with machine 10 and engine 12.

A model of regeneration frequency, at 100b, may be developed, for example, based on a history of experience with the particular type of engine, engine field tests, laboratory tests, etc. The model may provide a map of regeneration frequency that may be indicated based on various speeds and loads and/or other engine operating conditions, for example. The model may be implemented/installed in controller 14 associated with machine 10 and engine 12. A model of passive regeneration, at 100c, may be developed, for example, where a catalytic component is present in aftertreatment element 20. In a manner similar to other models related to particulate matter accumulation, the model may provide a map of passive regeneration based on engine operation at various speeds and/or loads and/or other engine operating conditions, for example. The model also may be implemented/installed in controller 14 associated with machine 10 and engine 12.

Engine operation may begin, as indicated at 102, and may operate under various conditions (load, speed, etc.) depending on the type of machine 10 in which the engine 12 is employed and depending on the machine demands. During engine operation, various diagnostic devices, otherwise known in the art, may be employed to convey data to controller 14 that are relevant to engine operation. For example, controller 14 may receive data indicating actual engine speed, actual engine load, fuel consumption, etc. Also during engine operation, it is generally unavoidable that particulate matter (e.g., soot, ash, etc.) is generated during the process of combustion within the engine and exhausted from the engine via exhaust system 16.

As engine 12 operates and exhausts particulate matter into exhaust system 16, the particulate matter may be deposited within and accumulate within aftertreatment element 20, e.g., at 104. Aftertreatment element 20 may include, for example, a particulate filter which, in the case where engine 12 is a diesel engine, is generally referred to as a diesel particulate filter (DPF). Aftertreatment element 20 also may include a separate or integral catalytic component which may, for example, be employed to enhance oxidation of particulate matter, or enhance conversion of potentially harmful emissions into relatively benign components.

While engine 12 operates and exhaust flows through exhaust system 16 and through aftertreatment element 20, flow resistance diagnostic element 50 may be employed to suitably monitor and detect the resistance to flow across the aftertreatment element 20, e.g., at 106, and convey the measured result to controller 14. A "clean" aftertreatment element 20 that has not accumulated any substantial particulate matter may routinely offer a lower resistance to flow, while the resistance to flow may increase with an increased accumulation of particulate matter. In other words, as the flow resistance diagnostic element 50 indicates and conveys to controller 14 an increased resistance to flow, controller 14 may readily convert the flow resistance value to a particular level of particulate matter accumulation.

At some point in time after engine operation has begun and particulate matter has accumulated within aftertreatment element 20, controller 14 may initiate a regeneration cycle, at 108, to perform regeneration of aftertreatment element 20. Regeneration may occur in various ways, for example by increasing the temperature within the aftertreatment element 20 sufficiently to consume accumulated soot, which makes up the majority portion of the accumulated particulate matter. Upon termination of a regeneration cycle, aftertreatment element 20 may be returned to a relatively "clean" condition in the sense that soot may have been substantially consumed. Regeneration may be initiated by controller 14 periodically, for example on a regular basis, regardless of any particular level of accumulated particulate matter within the aftertreatment element 20. Alternatively, or additionally, regeneration may be initiated by controller 14 responsive to an indication (e.g., by flow resistance diagnostic element 50) that particulate matter has accumulated to a predetermined maximum permissible level within aftertreatment element 20.

Controller 14 includes, for example, the various models 100a, 100b, 100c for the engine 12 as indicated in FIG. 2. The models rely on the premise that engine 12 is operating within the parameters of a properly running engine. That is to say, the models presume engine 12 is not affected by anomalous factors, such as consuming fuel of higher than expected sulfur content, improper air/fuel ratios due to abnormal boost leaks, excessive overcooling of the engine, or excessive oil consumption. Controller 14 may process data received from flow resistance diagnostic element 50 regarding flow resistance values over time through aftertreatment element 18, correlate the data with the models, at 110, and provide an indication (e.g., a warning and/or an internal calculation that may be employed to initiate an action) whether data from flow resistance diagnostic element 50 are at variance with one or more of the models. Correlation may include employing the models to adapt flow resistance calculations to compensate for any anomalous sensor data that may occur as a result of factors affecting engine system operation.

As the flow resistance values increase over time, variances from the predetermined values for the models are indicated. Indication of a variation from one or more models may implicate one or more actions with a view toward returning particulate matter accumulation rates in aftertreatment element 20 to values consistent with the models. One or more actions may be initiated at 112 to compensate for an increased rate of particulate matter accumulation in the aftertreatment element. The action at 112 may be initiated by controller 14 as a machine response to correlation of data from flow resistance diagnostic element 50 with on-board models at 110. Alternatively, the action at 112 may be initiated by an operator based on indication by controller 14 of variance from one or more models.

One action that may be initiated, at 114, may be a change in regeneration strategy, including an increase in the frequency of regeneration. Another action that may be initiated, at 116, may be a change of fuels. For example, where fuel source 44 supplies fuel having a high sulfur content affecting particulate matter accumulation in aftertreatment element 20, an operator may initiate action to convert to fuel having a lower sulfur content, e.g., ultra-low sulfur fuel. Another action that may be initiated, for example to prevent possible formation of sulfuric acid in the CGI system 36 and/or to prevent induction of inadequately treated exhaust gases into the intake system 22, is disabling the CGI system at least until a fuel having a lower sulfur content may become available. Another action that may be initiated, at 118, may be inspection and determination of any excessive, abnormal boost leaks and, where present, repair of any leaks and/or replacement of offending components. Yet another action may be initiatives to diagnose the cause of and eliminate excessive oil consumption.

Systems and methods have been described that will facilitate maintaining the efficiency of an aftertreatment element, such as a particulate filter, as well as maintaining engine operation efficiency. Effective systems and methods for compensating for factors affecting particulate matter accumulation within an aftertreatment element of an engine exhaust system have been disclosed. It will be apparent to those having ordinary skill in the art that various modifications and variations can be made to the disclosed methods and systems without departing from the scope of the disclosure.

Other embodiments will be apparent to those having ordinary skill in the art from consideration of the specification and practice of the disclosed embodiments. It is intended that the specification and examples be considered as exemplary only with the true scope of protection being indicated by the following claims.

What is claimed is:

1. A method of compensating for factors affecting particulate matter accumulation within an aftertreatment element of an engine exhaust system, the method comprising:

determining rate of change of flow resistance through the aftertreatment element over time;

initiating regeneration to reduce particulate matter accumulation within the aftertreatment element;

correlating the determined rate of change of flow resistance through the aftertreatment element over time with at least a model of particulate matter accumulation within the aftertreatment element, the model being based on predetermined values for particulate matter accumulation;

controlling regeneration to compensate for an increased rate of particulate matter accumulation in the aftertreatment element determined based on the correlation;

enabling a gas induction system to deliver a portion of engine exhaust gases to an air intake system for the engine; and disabling the gas induction system to compensate for the increased rate of particulate matter accumulation.

2. The method of claim 1, wherein correlating the determined rate of change of flow resistance through the aftertreatment element over time with the model includes correlating with both a model of active regeneration and a model of passive regeneration.

3. The method of claim 1, wherein at least one of the factors affecting particulate matter accumulation includes an elevated sulfur content in engine fuel, and wherein correlating the determined rate of change of flow resistance includes correlating with a model of passive regeneration of the aftertreatment element based on predetermined values for passive regeneration.

4. The method of claim 3, further comprising fueling the engine with ultra low sulfur fuel to compensate for the increased rate of particulate matter accumulation in the aftertreatment element.

5. The method of claim 1, wherein the engine includes a boosted air intake system, and at least one of the factors affecting particulate matter accumulation includes an excessive leak in the boosted air intake system, and wherein correlating the determined rate of change of flow resistance includes correlating with a model of active soot oxidation in the aftertreatment element based on predetermined values for active soot oxidation.

6. The method of claim 5, further comprising repairing the excessive leak in the boosted air intake system to compensate for an increased rate of particulate matter accumulation in the aftertreatment element.

7. The method of claim 1, wherein at least one of the factors affecting particulate matter accumulation includes excessive oil consumption or overcooling of the engine, and wherein correlating the determined rate of change of flow resistance through the aftertreatment element over time with the model includes correlating with a model of active soot oxidation in the aftertreatment element based on predetermined values for active soot oxidation.

8. A system for compensating for factors affecting particulate matter accumulation within an aftertreatment element of an exhaust system of an engine, the system comprising:

at least one filter section within the aftertreatment element; and a controller configured to:
determine rate of change of flow resistance through the aftertreatment element over time;
initiate regeneration to reduce particulate matter accumulation within the aftertreatment element;
correlate the determined rate of change of flow resistance through the aftertreatment element over time with at least a model of particulate matter accumulation within the aftertreatment element, the model being based on predetermined values for particulate matter accumulation;
determine whether a sulfur content in fuel supplied to the engine exceeds a predetermined value; and
control regeneration to compensate for an increased rate of particulate matter accumulation in the aftertreatment element determined based on the correlation and in response to determining that the sulfur content exceeds the predetermined value.

9. The system of claim 8, further including:
an air intake system for the engine;
a gas induction system configured to deliver a portion of engine exhaust gases to the air intake system; and
wherein the controller is configured to compensate for an increased rate of particulate matter accumulation in the aftertreatment element by disabling the gas induction system.

10. The system of claim 8, wherein at least one of the factors affecting particulate matter accumulation includes an elevated sulfur content in engine fuel, and wherein the controller is configured to correlate the determined rate of change of flow resistance through the aftertreatment element over time with a model of passive regeneration of the aftertreatment element based on predetermined values for passive regeneration.

11. The system of claim 8, further including:
an air intake system for supplying intake air for the engine;
a compressor associated with the air intake system and configured to boost the pressure of the intake air and deliver air of boosted pressure to the engine, and wherein at least one of the factors affecting particulate matter accumulation includes an excessive leak in the air intake system resulting in a reduction in the boosted pressure; and
wherein the controller is configured to correlate the determined rate of change of flow resistance through the aftertreatment element over time with a model of active soot oxidation in the aftertreatment element based on predetermined values for active soot oxidation.

12. The system of claim 8, wherein at least one of the factors affecting particulate matter accumulation includes excessive oil consumption or overcooling of the engine, and wherein the controller is configured to correlate the determined rate of change of flow resistance through the aftertreatment element over time with a model of active soot oxidation in the aftertreatment element based on predetermined values for active soot oxidation.

13. A machine, comprising:
an engine including an exhaust system and an air intake system;
an aftertreatment element, including at least one filter section, in the exhaust system;
a control system including a controller, the controller configured to:
determine rate of change of flow resistance through the aftertreatment element over time;
initiate regeneration to reduce particulate matter accumulation within the aftertreatment element;
correlate the determined rate of change of flow resistance through the aftertreatment element over time with at least a model of particulate matter accumulation within the aftertreatment element, the model being based on predetermined values for particulate matter accumulation;
enable a gas induction system to deliver a portion of engine exhaust gases from a location in the exhaust system to the air intake system for the engine; and
control the gas induction system to stop the delivery of the engine exhaust gases to the air intake system to compensate for an increased rate of particulate matter accumulation in the aftertreatment element determined based on the correlation.

14. The machine of claim 13, wherein the gas induction system is a clean gas induction system configured to deliver exhaust gases from a location downstream of the aftertreatment element to the air intake system.

15. The machine of claim 14, wherein the aftertreatment element includes a catalytic component, and the controller is configured to compensate for an increased rate of particulate matter accumulation in the aftertreatment element by disabling the clean gas induction system.

16. The machine of claim 13, further including:
a compressor associated with the air intake system and configured to boost the pressure of intake air supplied by the air intake system and deliver air of boosted pressure to the engine, and wherein an excessive leak in the air intake system resulting in a reduction in the boosted pressure affects particulate matter accumulation; and
wherein the controller is configured to correlate the determined rate of change of flow resistance through the aftertreatment element over time with a model of active soot oxidation in the exhaust element based on predetermined values for active soot oxidation.

17. The machine of claim 13, wherein at least one of excessive oil consumption and engine overcooling affects particulate matter accumulation, and wherein the controller is configured to correlate the determined rate of change of flow resistance through the aftertreatment element over time with a model of active soot oxidation in the aftertreatment element based on predetermined values for active soot oxidation.

18. The system of claim 8, wherein the controller is further configured to initiate fuelling the engine with fuel having a lower sulfur content to compensate for the increased rate of particulate matter accumulation in the aftertreatment element determined based on the correlation and in response to determining that the sulfur content exceeds the predetermined value.

19. The system of claim 8, wherein the controller is further configured to:
periodically initiate regeneration to reduce particulate matter accumulation within the aftertreatment element;
correlate the determined rate of change of flow resistance through the aftertreatment element over time with a model of regeneration frequency of the aftertreatment element, the model being based on predetermined values for regeneration frequency; and
increase regeneration frequency to compensate for the increased rate of particulate matter accumulation in the aftertreatment element determined based on the correlation with the models.

20. The method of claim 1, wherein regeneration is initiated periodically to reduce particulate matter accumulation within the aftertreatment element, the determined rate of change of flow resistance through the aftertreatment element over time is further correlated with a model of regeneration frequency, the model of regeneration frequency being based on predetermined values for regeneration frequency, and the method further includes:
increasing regeneration frequency to compensate for the increased rate of particulate matter accumulation in the aftertreatment element determined based on the correlation with the models.

21. The method of claim 1, wherein determining the rate of change of flow resistance through the aftertreatment element over time includes:
determining a pressure drop across the aftertreatment element; and
determining the rate of change of flow resistance through the aftertreatment element over time based on the determined pressure drop.

\* \* \* \* \*